United States Patent [19]

Doemens

[11] Patent Number: 4,934,198

[45] Date of Patent: Jun. 19, 1990

[54] DISPLACEMENT AND TORQUE SENSOR USING RESISTANCE ELEMENT THAT IS PROGRESSIVELY SHORTED

[75] Inventor: Guenter Doemens, Holzkirchen, Fed. Rep. of Germany

[73] Assignee: Siemens Aktiengesellschaft, Berlin and Munich, Fed. Rep. of Germany

[21] Appl. No.: 216,110

[22] Filed: Jul. 7, 1988

[30] Foreign Application Priority Data

Jul. 22, 1987 [DE] Fed. Rep. of Germany ....... 3724288

[51] Int. Cl.$^5$ .......................... G01L 3/10; G01B 13/24
[52] U.S. Cl. ..................................... 73/862.33; 33/786
[58] Field of Search ................. 73/862.33; 338/38, 27, 338/94; 33/147 C

[56] References Cited

U.S. PATENT DOCUMENTS

| | | | |
|---|---|---|---|
| 934,713 | 9/1909 | Davies | 73/750 X |
| 1,125,236 | 1/1915 | Whiting | 33/147 C X |
| 1,245,559 | 11/1917 | Booth | 33/172 C |
| 2,297,644 | 9/1942 | Angst . | |
| 3,208,284 | 9/1965 | Rivero . | |

FOREIGN PATENT DOCUMENTS

| | | |
|---|---|---|
| 408621 | 1/1910 | France . |
| 433361 | 10/1911 | France . |
| 88291 | 2/1921 | Switzerland . |
| 379156 | 6/1964 | Switzerland . |
| 433379 | 8/1935 | United Kingdom . |

OTHER PUBLICATIONS

"Eine Drehmomentuberwachung, Die Vorausdenken Kann", No. 20, Mar. 15, 1987.

*Primary Examiner*—Charles A. Ruehl
*Attorney, Agent, or Firm*—Hill, Van Santen, Steadman & Simpson

[57] ABSTRACT

Measurement sensor for length or distance changes, particularly for non-contacting measurement of torques of rotating shafts. In known measurement sensors, the length or distance change ($\Delta x$) is amplified by a mechanical lever system and is then converted into an electrical quantity. In the novel measurement sensor of the present invention, the length or distance change ($\Delta x$) to be measured is transmitted to a displacer in order to enhance the precision. A displaced liquid, particularly mercury, is introduced into a capillary and the length of a liquid column in the capillary is converted into an electrical quantity, preferably as a change of a resistor. The new measurement sensor is particularly suitable for torque measurement.

17 Claims, 2 Drawing Sheets

DISPLACEMENT AND TORQUE SENSOR USING RESISTANCE ELEMENT THAT IS PROGRESSIVELY SHORTED

BACKGROUND OF THE INVENTION

The present invention is directed to a measurement sensor for measuring length or distance changes, particularly for non-contacting measurement of torques of rotating shafts, wherein the length or distance changes to be measured are amplified and converted into an electrical quantity.

Non-contacting, precise measurement of the output torque and, thus, of the mechanical power of rotating shafts is currently one of the most urgent sensing-related problems in energy and automation technology. The fields of application are in monitoring and regulating drives as well as in efficiency optimization of energy conversion systems.

For non-contacting measurement of torques, methods presently known make use either of the acquisition of the mechanical tension generated by the moment of the shaft surface or of the measurement of the torsion.

For converting the mechanical tension into an electrical quantity, wire strain gauges are attached to the shaft and the measured signal is taken via a carrier frequency of the rotating shaft. The method has been known for a long time, but has been predominantly used in the laboratory domain since the application of the wire strain gauges to the shaft is complex and the metrological transmission is very costly. Recent developments are also known wherein the change in the permeability of amorphous metal layers due to mechanical stresses is exploited for torque measurement. Here, however, there are still problems in the application of the amorphous metal layers onto the shaft.

The torsion of a shaft for standard shaft diameters and torques is extremely low. For a 70 mm-thick shaft of an electric motor, for example, the torsion at nominal torque amounts to only a few micrometers at a measuring distance of 30 mm. In order to increase the torsion distance, a longer measuring shaft is joined to the shaft end and the torsion is taken in a non-contacting fashion via inductive systems. This method, however, is not practical since space for the additional measuring shaft is usually not present. Nonetheless, in order to render the torque measurable via torsion of a shaft end that is usually short, the publication "VDI-Nachrichten", No. 20, 15 May 1987, discloses a method wherein the torsion path on the shaft is converted into an axial movement by a mechanical lever system. The axial displacement in the region of tenths of a millimeter is taken in a non-conducting fashion via an inductive system. The axial measuring distance on the shaft thereby corresponds to about twice the shaft diameter. Such an acquisition of torques, however, requires a relatively complex mechanism, however the obtainable precision of about 5% is not adequate for many applications.

SUMMARY OF THE INVENTION

An object of the present invention is to provide a measurement sensor for measuring torques that, both in the idle state as well as in the rotating state, can record the moment transmitted via the shaft and, thus, the mechanical power with a precision of ±0.5% in a non-contacting fashion and which outputs an electrical signal proportional to the torque.

In a measurement sensor of this type, this object is achieved by a sensor having the following features:

The length or distance change to be measured is transmittable onto a displacer;

Liquid displaced by the displacer is introduceable into a capillary; and

The electrical quantity is derivable from length changes of the liquid column in the capillary.

The invention is based on the fact that hydraulic amplification of the length or distance changes to be measured can be realized in a simple way and also allows a significantly greater precision as well as a noticeably higher amplification factor than the known, mechanical amplification having a lever system. In the hydraulic amplification, the area relationships of displacer and capillary enter into the gain. Dependent on the cross-sectional ratio of displacer to capillary, path amplification up to 1:5000 can be realized. Given measurement sensors for the measurement of torques, an extremely small space requirement in an axial direction results. In addition to being utilized for the measurement of torques, the hydraulic/electrical principle of the present invention can also be generally utilized in the measurement of mechanical dilatations or tensions and can replace the conventional wire strain gauge in some instances. Overload protection in a harsh environment is one use of the present invention.

When the displacer is formed by a membrane, then a further reduction of the space requirement results in comparison to the use of pistons as the displacer.

A particularly simple transmission arrangement is achieved in that the length or distance change to be recorded is transmittable onto the displacer by a transmission element directed transversely relative thereto.

An especially preferred development of the present invention is characterized by an electrically conductive liquid. The derivation of the electrical quantity from the length changes of the liquid column in the capillary is considerably facilitated. Mercury is thereby preferably used as an electrically conductive liquid. Mercury permits the use of the measurement sensor within an extremely wide temperature range. Moreover, a moistening of the inside wall of the capillary that is undesirable in view of optimally high precision is suppressed by the use of Mercury.

When using an electrically conductive liquid, length changes in the liquid column in the capillary can then be simply converted into changes of an ohmic resistance. This requires a significantly lower structural complexity than an inductive acquisition of length changes of the liquid column in the capillary. The conversion of the length changes into changes of an ohmic resistance can be realized in an especially simple way in that the resistance can be short-circuited area-by-area by the liquid column dependent on length changes of the liquid column in the capillary. In view of an optimally simple structure of the measurement sensor for low manufacturing costs, it has also proven advantageous when at least certain regions of the capillary are formed by a groove proceeding between two plates pressing against one another and a resistor is applied to one of the plates as a metallic thin-film layer. For further simplification of manufacture, the groove can be formed on the inside of one plate, and the resistor is applied to the inside of the other plate.

Optimally high changes in resistance proportional to the length or distance changes can be realized in that the resistor, or at least regions thereof have a meander-shaped course crossing the capillary.

An undesired expansion of the liquid volume in the capillary caused by increases in temperature can be completely compensated for by, first, a small liquid volume and, second, by appropriate selection of the coefficient of expansion of the surrounding chamber material. In order to increase the precision as well as to compensate for temperature effects, the length or distance change to be recorded is preferably transmitted onto two oppositely working displacers each of which has a capillary allocated to it. A further increase in the precision results when the electrical quantities derivable from length changes of the liquid columns in the capillaries are convertable into electrical voltage changes with a bridge circuit.

For use of the measurement sensor of the present invention for non-contacting measurement of torques of rotating shafts, by recording the change in the length or distance, it is provided that the torsion occurring in prescribable, axial measuring distance of the shaft is transferable onto the displacer. An especially low space requirement can thereby be achieved in that the axial measuring distance corresponds to at most half the diameter of the shaft.

In accordance with a further, preferred development of the present invention, two clamp rings lying against the shaft line-shaped in a circumferential direction are provided for taking the torsion. The torsion between the line-shaped seats located in the axial measuring distance can then be transmitted in an especially simple way onto the displacer as relative movement between the two clamp rings. The transmission element in an axial direction is expediently secured to one clamp ring, whereas the displacer together with the capillary is rigidly located on the other clamp ring. When the capillary is aligned in the axial direction of the shaft, then possible influences of centrifugal forces on the precision of the measurement sensor can be suppressed.

The electrical quantity derived from length changes of the liquid column in the capillary can be taken from the rotating shaft in an inductively non-contacting fashion. Other non-contacting means can be used for transmitting the derived electrical quantity (see FIG. 6, for example). For further simplification of the structure, a capacitive transmission of the electrical quantity is preferably undertaken. At least one cylinder capacitor arranged coaxially relative to the shaft is then provided for this capacitive transmission, one electrode thereof being connected to the shaft and the other electrode thereof being stationarily arranged with respect to the shaft.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS.

Figure 1:
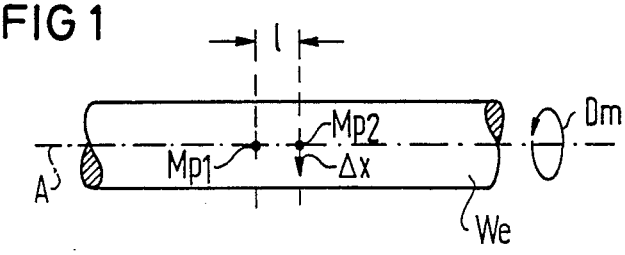
FIG. 1 is a depiction of the acquisition of the torsion of a shaft as measured for the transmitted torque.

FIG. 1 shows a shaft We rotatable around an axis A, two measuring points Mp1 and Mp2 lying in the axial measuring distance 1 being arranged on the circumferential surface of this shaft We. When a torque indicated by the arrow Dm is transmitted by the shaft We, the torsion of the shaft We occurring between the measuring points MP1 and MP2 forms a measure of the torque Dm. In FIG. 1, this torsion, which is proportional to the torque Dm, is indicated by the length change $\Delta x$ occurring between the measuring points MP1 and MP2 in a circumferential direction.

Figure 2:
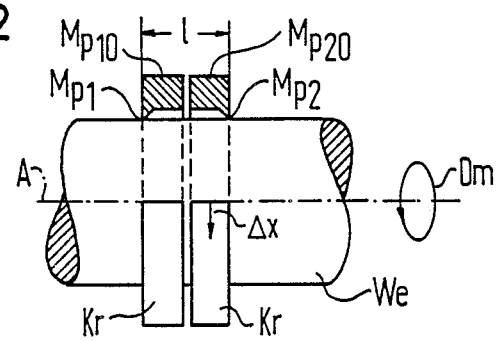
FIG. 2 is a partial cross-sectional side view of a portion of the present invention showing the taking of the torsion on the basis of two clamp rings arranged at a distance from one another on the shaft.

As shown in FIG. 2, two clamp rings Kr are secured to the shaft We for taking the torsion $\Delta x$ indicated in FIG. 1, being secured thereto such that their line-shaped seats in a circumferential direction have the axial measuring distance 1. The torsion $\Delta x$ between the measuring points MP1 and MP2 can then be taken as a relative movement in the circumferential direction occurring between the clamp rings Kr. The term "line-shaped" refers to the configuration of the clamp rings Kr shown in FIG. 2 wherein the clamp rings Kr only contact the shaft We along a line at Mp1 and Mp2 which is a circumference of the shaft We. For transmission of a torque Dm by the shaft We, the measuring points MP10 and MP20 illustrated on the clamp rings Kr then are twisted relative to one another by the torsion $\Delta x$.

Figure 3:
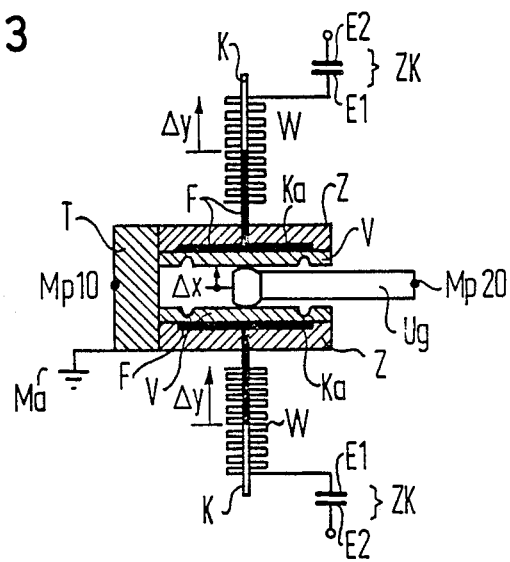
FIG. 3 is a cross-sectional view of a measurement sensor for the non-contacting measurement of torques on the basis of hydraulic/electrical acquisition of the torsions.

As shown in FIG. 3, a cross-axially directed carrier T is secured to the measuring point MP10, whereas an axially directed element Ug is secured to the measuring point Mp20. The clamp rings Kr, shown in FIG. 2 and only indicated here in FIG. 3, can be fastened by soldering, welding, screwing or the like. The carrier T carries two cylinders Z located at a distance from one another in a circumferential direction and designed in an extremely flat fashion and having chambers Ka which are each closed by membranes V. Each of the two chambers Ka is filled with an electrically conductive liquid F that can escape into capillaries K when there is a decrease in the chamber volume. The liquid F in the illustrated exemplary embodiment is mercury. When a torsion $\Delta x$ is then transmitted via a free end of a transmission element Ug that is fashioned bone-shaped, the torsion $\Delta x$ being transmitted onto the membranes or displacers V located on both sides thereof and fashioned in a relatively stiff manner, then length changes $\Delta y$ that are oppositely directed and are proportional to the torsion $\Delta x$ and, thus, to the torque Dm (see FIGS. 1 and 2) can be derived from the capillaries K. The amplification $\Delta y/\Delta x$ results from the cross-sectional relationship of the membrane V to the capillary K, whereby the length changes $\Delta y$ of the liquid columns can reach a number of centimeters. In order to be able to derive electrical quantities from these length changes Δy of the liquid columns, or mercury columns, meander-shaped resistors W cross the mercury columns, these resistors W being more or less short-circuited. The residual resistances is then proportional to the torque Dm, these being connected, first, to the ground Ma via the mercury columns and, second, to the respective inner electrode E1 of a cylinder capacitor Zk. The two cylinder capacitors Zk schematically shown in FIG. 3 serve as coupling capacitors for the non-contacting, capacitive transmission of the resistance changes proportional to the torque Dm (see FIGS. 1 and 2). The inner electrodes E1 are mechanically connected to the shaft We (see FIGS. 1 and 2), whereas the outer electrodes E2 are stationarily located with respect to the shaft We.

Figure 4:
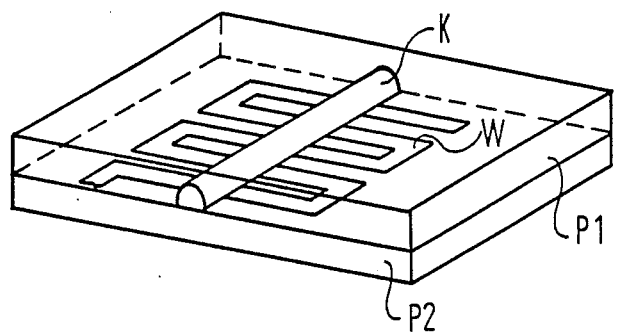
FIG. 4 is a perspective view of an embodiment of a capillary and a resistor in the measurement sensor according to FIG. 3.

FIG. 4 shows that the capillary K is fashioned as a U-shaped groove on the inside of a plate P1 and that the meander-shaped resistor W is formed on the inside of a second plate P2, whereby the two plates P1 and P2 composed of glass have their insides connected in a liquid-tight fashion by pressure, gluing or the like. The cross-section of the capillaries K or, of the groove can be 0.3 mm×0.3 mm, for example. The capillary K should not be narrower since a breaking of the mercury columns due to the capillary effect could result. The resistor W formed on the plate P2 as a meander-shaped thin-film layer can be composed, for example of nickel. For a layer thickness of 0.1 μm, a track width of 80 μm and about 150 meanders over a length of 20 mm, results in an overall resistance of 50 kΩ.

Figure 5:
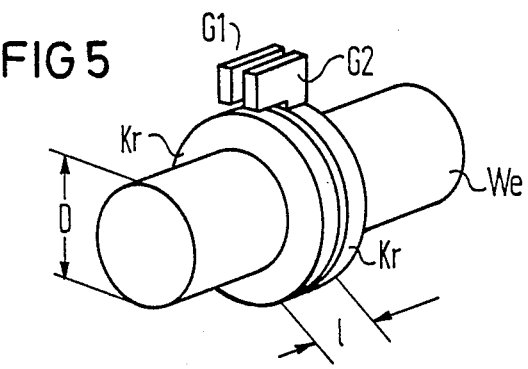
FIG. 5 is a perspective view of an arrangement of the clamp rings and of the measurement sensor of FIG. 4 on the shaft.

In a greatly simplified, perspective view, FIG. 5 shows the geommetrical and structural arrangement of the overall measurement sensor on the shaft We. The two clamp rings Kr are secured side-by-side on the shaft. Two rectangular housings G1 and G2 which contain the parts shown in FIG. 3 are secured on the clamp ring Kr which is located at the right in FIG. 2. The fastening of the transmission element Ug on the left-hand clamp ring Kr and its arrangement between the two housings G1 and G2 cannot be seen in FIG. 5. However, it should also be pointed out that the capillaries K in the housings G1 and G2 are aligned in an axial direction and not in a circumferential direction, according to the simplified, elongated illustration of FIG. 3. The extremely compact and space-saving design of the overall measurement sensor can also be seen in FIG. 5. The axial measuring distance l is thereby less than half the diameter D of the shaft We.

Figure 6:
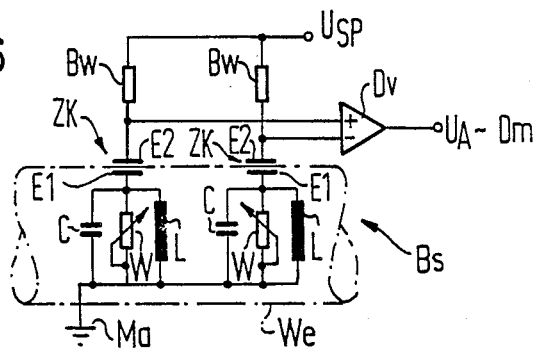
FIG. 6 is a schematic of a bridge circuit for capacitive transmission of the electrical quantities recorded with the measurement sensor of FIG. 3.

FIG. 6 shows a bridge circuit Bs for the capacitive transmission of the resistances W proportional to the respective torque Dm (see FIGS. 1 and 2) of the shaft We, shown with dotted lines. As has already been set forth with reference to FIG. 3, the variable resistors W are connected to ground Ma at one side, whereas the other side is connected to the inner electrode E1 of the cylinder capacitor Zk. The ground Ma can be connected to the shaft We in non-contacting fashion, since, for example, the capacitative coupling between rotor and stator of a corresponding machine is fully adequate for this purpose.

A capacitor C and a coil L are respectively connected in parallel with the resistor W in the illustrated circuit arrangement. The capacitor C is representative of the stray capacitance of the respective cylinder capacitor Zk to the shaft We, whereas the coils L resonant with the capacitors C and compensate for these stray capacitances.

The outer electrodes E2 of the cylinder capacitor Zk are stationarily located relative to the shaft We and are connected, first, to a supply voltage $U_{Sp}$ having a frequency of about 1MHz, via bridge circuit supplementary resistors Bw, and, second, are directly connected to the input of a differential amplifier Dv. This differential amplifier Dv then provides an output voltage $U_A$ which is proportional to the torque Dm transmitted by the shaft We. With the arrangement set forth, the torque Dm transmitted via the shaft We and, thus, the mechanical power in both the idle as well as in the rotating states can be non-contactingly measured with a precision of ±0.5° in a temperature range from −35° C. through +60° C.

The conversion of minute displacements into proportional changes of resistance by the hydraulic/electrical principle depicted in FIG. 3 can also be generally utilized in the measurement of mechanical dilatations or tensions and can replace conventional wire strain gauges in some instances. An example thereof is that of an overload protection in a rugged environment. Dependent on the demands, the non-contacting transmission disclosed for the torque measurement can also be eliminated.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

I claim:

1. A measurement sensor for measurement of torques of rotating shafts, that converts the torque to be measured into an electrical quantity, comprising:

a transmission element (Ug) for transmitting the torsion (Δx) of a prescribed section of a rotating shaft to at least one displacer (V);

a liquid (F) in a capillary (K) being displaced by the displacer (V); and means for deriving the electrical quantity from length changes (Δy) of a liquid column of the liquid (F) in the capillary (K), the length changes (Δy) of the liquid column in the capillary (K) being converted by short circuiting an ohmic resistor (W) area-by-area by the liquid column dependent on length changes (Δy) of the liquid column in the capillary (K).

2. The measurement sensor according to claim 1, wherein the displacer (V) is a membrane.

3. The measurement sensor according to claim 1, wherein the transmission element (Ug) is positioned transversely relative to the displacer (V).

4. The measurement sensor according to claim 1, wherein the liquid (F) is an electrically conductive liquid.

5. The measurement sensor according to claim 4, wherein the electrically conductive liquid is mercury.

6. A measurement sensor responsive to length and distance changes, and for measurement of torques of rotating shafts, that converts the torque to be measured into an electrical quantity, comprising:

a transmission element (Ug) for transmitting the torsion (Δx) of a prescribed section of a rotating shaft to at least one displacer (V);

a liquid (F) in a capillary (K) being displaced by the displacer (V), the liquid (F) being an electrically conductive liquid;

means for deriving the electrical quantity from length changes ($\Delta y$) of a liquid column of the liquid (F) in the capillary (K), the length changes ($\Delta y$) of the liquid column in the capillary (K) being converted by short circuiting an ohmic resistor (W) area-by-area by the liquid column dependent on length changes ($\Delta y$) of the liquid column in the capillary (K), at least one region of the capillary (K) being formed by a groove located between two adjacent plates; and the resistor (W) being formed on one of the plates as a metallic thin-film layer.

7. The measurement sensor according to claim 6, wherein the groove is formed on the inside of one plate; and wherein the resistor (W) is formed on the inside of the other plate.

8. The measurement sensor according to claim 6, wherein at least one region of the resistor (W) has a meander-shaped course crossing the capillary (K).

9. A measurement sensor responsive to length and distance changes, and for measurement of torques of rotating shafts, that converts the torque to be measured into an electrical quantity, comprising:

a transmission element (Ug) for transmitting the torsion ($\Delta x$) of a prescribed section of a rotating shaft to two displacers working oppositely to one another;

each of the displacers having a liquid (F) in a capillary (K) being displaced by the respective displacer;

means for deriving the electrical quantity from length changes ($\Delta y$) of liquid columns of the liquids in the capillaries in each of the displacers.

10. The measurement sensor according to claim 9, wherein the electrical quantity derived from length changes ($\Delta y$) of the liquid columns in the capillaries (K) is converted into electrical voltage changes ($U_M$) with a bridge circuit (Bs).

11. A measurement sensor responsive to length and distance changes, and for measurement of torques of rotating shafts, that converts the torque to be measured into an electrical quantity, comprising:

a transmission element (Ug) for transmitting the torsion ($\Delta x$) of a prescribed section of a rotating shaft to at least one displacer (V);

a liquid (F) in a capillary (K) being displaced by the displacer (V); and means for deriving the electrical quantity from length changes ($\Delta y$) of a liquid column of the liquid (F) in the capillary (K), the torque ($\Delta x$) being a torsion occurring in the prescribed section of the rotating shaft.

12. The measurement sensor according to claim 11, wherein, for taking the torsion, two parallel clamp rings are provided circumferentially on the shaft.

13. The measurement sensor according to claim 11, further including means for capacitive transmission of the electrical quantity connected to said means for deriving.

14. The measurement sensor according to claim 13, wherein said means for capacitive transmission has at least one cylinder capacitor, located coaxially relative to the shaft, one electrode thereof being connected to the shaft and the other electrode thereof being stationarily located with respect to the shaft.

15. A measurement sensor responsive to length and distance changes, and for measurement of torques of rotating shafts, that converts the torque to be measured into an electrical quantity, comprising:

a transmission element (Ug) for transmitting the torsion ($\Delta x$) of a prescribed section of a rotating shaft to at least one displacer (V);

a liquid (F) in a capillary (K) being displaced by the displacer (V); and means for deriving the electrical quantity from length changes ($\Delta y$) of a liquid column of the liquid (F) in the capillary (K), the prescribed rotating shaft section having a predetermined axial extent less than or equal to half the diameter of the shaft.

16. A measurement sensor responsive to length and distance changes, and for measurement of torques of rotating shafts, that converts the torque to be measured into an electrical quantity, comprising:

a transmission element (Ug) for transmitting the torsion ($\Delta x$) of a prescribed section of a rotating shaft to at least one displacer (V);

a liquid (F) in a capillary (K) being displaced by the displacer (V); and means for deriving the electrical quantity from length changes ($\Delta y$) of a liquid column of the liquid (F) in the capillary (K), the prescribed rotating shaft section having a predetermined axial extent less than or equal to half the diameter of the shaft, two parallel clamp rings being provided circumferentially on the prescribed shaft section, and the transmission element being secured in an axial direction on one of the clamp rings; and the displacer with the associated capillary being rigidly attached to the other clamp ring.

17. The measurement sensor according to claim 16, wherein the capillary is aligned in an axial direction of the shaft.

* * * * *